United States Patent Office 3,244,741
Patented Apr. 5, 1966

3,244,741
METHOD OF PRODUCING NITRILES OF COMPOUNDS OF THE VITAMIN A SERIES
Ludovicus Petrus Theodorus Maria Zevenhuizen, Wageningen, Netherlands, assignor to North American Philips Company, Inc., New York, N.Y., a corporation of Delaware
No Drawing. Filed Oct. 3, 1962, Ser. No. 228,005
Claims priority, application Netherlands, Oct. 26, 1961, 270,680
9 Claims. (Cl. 260—464)

This invention relates to a new and novel method of producing compounds of the vitamin A series.

A principal object of this invention is to provide a new and novel method of adding isoprene chains to compounds of the vitamin A series.

This and other objects of the invention will be apparent from the description that follows:

According to our invention we have found that aldehydes and ketones of the vitamin A series condense with 2-cyano-3-methyl crotonic acid or functional derivatives thereof such as esters or the acid amide thereof according to the reaction:

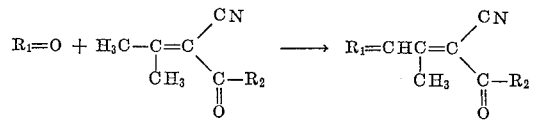

wherein $R_1=O$ is an aldehyde or ketone of the vitamin A series and $R_2$ is a member of the group consisting of —OH, —NH$_2$ and —OR$_3$ wherein $R_3$ is a lower alkyl radical of 1–6 carbon atoms. We have found that this reaction will take place only in the presence of all alkaline condensation agents other than secondary amines and salts thereof. When this condensation was attempted with a secondary amine or a salt thereof a reaction took place between the amine and the aldehyde or ketone with the formation of enamines instead of the desired condensation reaction.

The aldehydes or ketones of the vitamin A series of the formula $R_1=O$ contain a cyclohexyl-group of the formula:

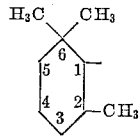

which may contain one or two double bonds, for example between the carbon atoms 1, 2; 2, 3; or 1, 2 and 3, 4. Besides these compounds have at the carbon atom 1 of the cyclohexyl group an aliphatic group with 1 to 11 carbon atoms, containing the double-bonded oxygen atom of the formula $R_1=O$ and one double bond or more double bonds which may be conjugated either with each other and/or with those which may be contained in the cyclohexyl group.

Examples of these aldehydes or ketones are compounds of the following formulae:

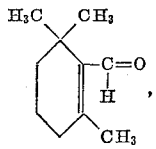 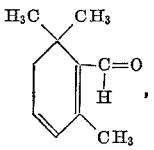 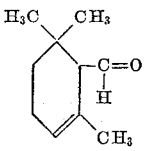

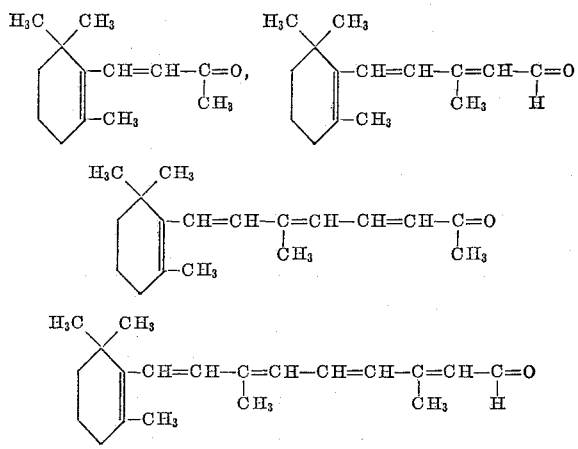

The reaction is particularly suitable for use with aldehydes or ketones of the vitamin A series, of which the double-bonded oxygen atom is in conjugation with one or more double bonds, for example β-ionone, β-ionylidene acetaldehyde, β-C$_{18}$-ketone, vitamin A aldehyde.

The reaction with β-ionylidene acetaldehyde as a starting substance has particular advantages, since this reaction directly leads to a compound in which the carbon skeleton of vitamin A is available. With the condensation of this aldehyde with the ethylester of 2-cyano-3-methyl crotonic acid the ethylester of 2-carboxy-vitamin A acid nitrile is obtained. This compound may be converted, subsequent to decarboxylation, into vitamin A acid nitrile. By the saponification of the nitrile into the corresponding vitamin A acid and subsequent reduction, for example by LiAlH$_4$, this acid can be converted into vitamin A.

The condensation of vitamin A aldehyde with 2-cyano-3-methyl crotonic acid or the functional derivatives thereof may also be important for the production of intermediate products for the production of β-carotene or for the production of compounds which may be used as coloring substances or aromatic substances.

The reaction is preferably carried out with an ester of 2-cyano-3-methylcrotonic acid, since it has been found that with this type of compound higher yields are obtained than with the 2-cyano-3-methylcrotonic acid or the amide itself. Reference may be made to the esters of the said acid and lower aliphatic alcohols with 1 to 8 carbon atoms, for example methanol, ethanol, propanol, propanol-3, butanol, pentanol, isopentanol. Very satisfactory results were obtained with the methylester and the ethylester.

Suitable condensation agents are, in particular, ammonium acetate, acetamide, alkalihydroxide, ammoniumpropionate and N,N-dimethyl- or N,N-diethyl-acetamide or mixtures thereof.

Particularly those condensation agents appeared to yield satisfactory results which render the reaction medium strongly alkaline. Therefore the use of alkali metal hydroxide, preferably sodium- or potassium-hydroxide, as a condensation agent, is preferred. Moreover, it was found that in this manner, at least when an ester of 2-cyano-3-methylcrotonic acid is used as a reaction component, a water-soluble reaction product is obtained owing to the saponification of the formed ester occurring during the reaction. This simplifies the processing of the reaction product. By extracting the reaction mixture, poured out in water, with a solvent which is at least substantially immiscible in water, for example diethylether, benzene or petroleum ether, the compounds not containing a salt group, can be readily separated from the reaction mixture and the desired final product can be isolated in a simple manner from the extracted aqueous layer. This may be carried out, for example, by acidifying the aqueous layer subsequent to extraction, for example with hydrochloric acid, so that the final product is separated out in the form of an oil layer. This layer can be readily dissolved in an organic solvent, for example diethyl ether or benzene, from which, for example by evaporation, the final product can be isolated in its pure state. In this manner it is fairly easy to obtain the product in the crystalline state.

The temperature at which the reaction according to the invention is carried out may vary between fairly wide limits. However, the reaction is preferably carried out at temperatures between about 0° C. and 100° C.

If desired, the method according to the invention may be carried out in the presence of a liquid diluent, in which the reaction components and the condensation agents are readily soluble. Suitable diluents are lower aliphatic alcohols of 1 to 8 carbon atoms such as methanol, ethanol, propanol, propanol-2, butanol, pentanol and octanol, aromatic hydrocarbons, such as benzene, toluene, aliphatic ethers or cyclized aliphatic esters, such as diethylether, methyl ethyl ether, di-isopropylether, tetrahydrofurane or dioxane. If an alkali-metal hydroxide is used as a condensation agent use is preferably made of an aliphatic alcohol as a solvent.

It is very desirable for the condensation reaction to be performed in a substantially anhydrous medium. A quantity of up to about 5% by weight of water may be included in the reaction medium without seriously disturbing the reaction. If a larger quantity of water is contained in the reaction medium, hydrolysis of 2-cyano-3-methylcrotonic acid ester or of the corresponding amide may occur, which also applies to the final product obtained. Moreover, the presence of water disturbs the condensation reaction itself. Since water is formed by the reaction, it is desirable to withdraw it during the condensation process as far as possible. If benzene is used as a solvent this may be carried out effectively by azeotrophic distillation.

My invention will now be described in greater detail with reference to the following example:

EXAMPLE

Condensation of trans-β-C₁₅-aldehyde with 2-cyano-3-methylcrotonic acid ethylester.

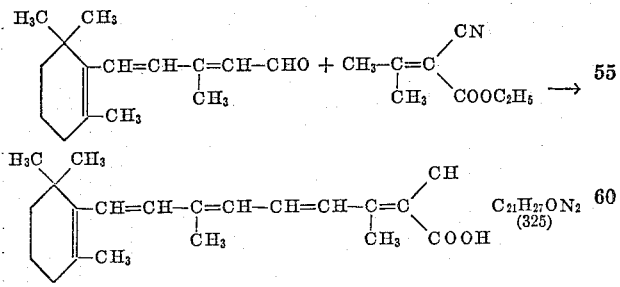

43.6 g. (0.2 mol) of trans-β-C₁₅-aldehyde and 30.6 g. (0.2 mol) of 2-cyano-3-methylcrotonic acid ethylester were dissolved in 80 ml. of methanol. A solution of 40 g. of KOH in 200 ml. of methanol was added thereto. This resulted in a solution having a deep orange-red color. This solution was refluxed for half an hour on a water bath. After cooling, the solution was poured out into 2 litres of water, the potassium salt of 2-carboxy-vitamin A acid nitrile being thus dissolved in water. This solution was extracted a few times with diethylether in order to remove non-acidic compounds. The water layer was then acidified by means of diluted H₂SO₄ and extracted with diethyl ether. After drying on Na₂SO₄ and distilling off the ether, 47 gms. of an orange oil remained, which had a value $E^{1\%}_{1\,cm.}\lambda(386\,m\mu): 505$ Pure 2-carboxy-vitamin A acid nitrile has a value $E^{1\%}_{1\,cm.}\lambda(397\,m\mu): 1,100$ The crude substance contained 46% of 2-carboxy-vitamin A acid nitrile, i.e. 21.6 g. (yield 34%).

The crude oil was dissolved in 60 mls. of methanol and crystallized in the refrigerator at 125° C. After two days 8.14 g. (12.5% of the 2-carboxy-vitamin A acid nitrile) was crystallized out. Melting point 175 to 180° C. (with decarboxylizing).

This substance was recrystallized from methanol, which yielded 6.5 g. of dark red crystals, melting point 188.5 to 191.5° C. ((397 mμ): 35,800).

While I have described my invention in connection with specific embodiments and applications, other modifications thereof will be readily apparent to those skilled in this art without departing from the spirit and scope of the invention as defined in the appended claims.

What I claim is:

1. The method of producing carboxy acid nitriles of the formula:

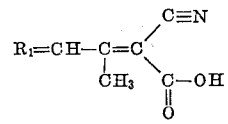

comprising condensing a compound of the formula R₁=O with a compound of the formula

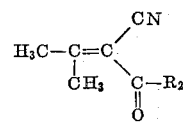

in the presence of an alkaline condensation agent free of secondary amino groups and then hydrolyzing the resultant salt to thereby form the free carboxy acid nitrile, R₁=O being a member of the group consisting of

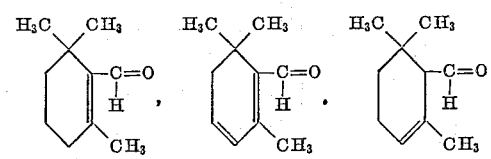

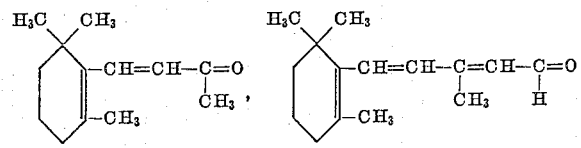

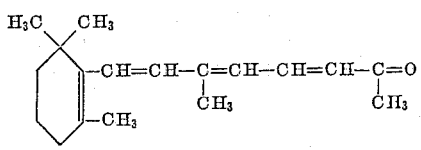

and

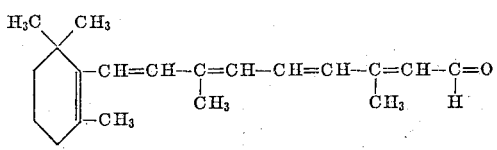

R₂ is a substituent selected from the group consisting of —OH, —NH₂ and —OR₃ wherein R₃ is a lower alkyl of 1-6 carbon atoms.

2. The method of claim 1 wherein in the compound $R_1=O$ a carbon to carbon double bond is in conjugated relationship with the double bonded oxygen atom.

3. The method of claim 2 wherein the compound $R_1=O$ is in an all-trans configuration.

4. The method of claim 1 wherein $R_1=O$ is β-ionylidene-acetaldehyde.

5. The method of claim 1 wherein the compound $R_1=O$ is condensed with an ester of 2-cyano-3-methyl crotonic acid.

6. The method of claim 1 wherein the condensation agent is a member of the group consisting of ammonium acetate, acetamide, alkali-metal hydroxides, ammonium propionate, N,N-dimethyl acetamide, N,N-diethyl acetamide and mixtures thereof.

7. The method of claim 6 wherein the condensation agent is an alkali metal hydroxide.

8. The method of claim 6 wherein the water content of the reaction medium is not greater than 5% by weight at the start of the reaction.

9. The method of claim 6 wherein any water formed during the reaction is separated from the reaction mixture.

References Cited by the Examiner

UNITED STATES PATENTS 2,150,154   3/1939   Cope _____ 260—465.4

FOREIGN PATENTS 532,088   10/1956   Canada.

OTHER REFERENCES

Royals: "Advanced Organic Chemistry," 1954, Prentice-Hall, pages 780 to 785.

CHARLES B. PARKER, *Primary Examiner.*